(12) United States Patent
Chen et al.

(10) Patent No.: US 10,085,056 B2
(45) Date of Patent: *Sep. 25, 2018

(54) METHOD AND SYSTEM FOR IMPROVING APPLICATION SHARING BY DYNAMIC PARTITIONING

(71) Applicant: INTERNATIONAL BUSINESS MACHINES CORPORATION, Armonk, NY (US)

(72) Inventors: Ming Chen, Beijing (CN); Jun Feng Liu, Beijing (CN); Jin Xin Ying, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,944

(22) Filed: Sep. 18, 2017

(65) Prior Publication Data

US 2018/0007417 A1 Jan. 4, 2018

Related U.S. Application Data

(63) Continuation of application No. 13/554,081, filed on Jul. 20, 2012, now Pat. No. 9,769,516, which is a
(Continued)

(30) Foreign Application Priority Data

Sep. 29, 2010 (CN) .......................... 2010 1 0506211

(51) Int. Cl.
*G06F 3/14* (2006.01)
*H04N 21/431* (2011.01)
*H04N 21/27* (2011.01)

(52) U.S. Cl.
CPC ......... *H04N 21/431* (2013.01); *G06F 3/1462* (2013.01); *H04N 21/27* (2013.01); *G09G 2360/122* (2013.01)

(58) Field of Classification Search
None
See application file for complete search history.

(56) References Cited

U.S. PATENT DOCUMENTS 6,115,501 A * 9/2000 Chun ................... H04N 19/503
358/1.9
7,171,444 B2 1/2007 Deshpande
(Continued)

FOREIGN PATENT DOCUMENTS

CN 1310415 A 8/2001
CN 1987862 A 6/2007
(Continued)

OTHER PUBLICATIONS

U.S. Appl. No. 13/239,446, Non-final Office Action, dated Jun. 12, 2012, 19 Pg.
(Continued)

*Primary Examiner* — Ryan M Gray
(74) *Attorney, Agent, or Firm* — Cuenot, Forsythe & Kim, LLC

(57) ABSTRACT

A method for improving application sharing by dynamic partitioning can include partitioning a screen display of an application into grid regions and, in response to detecting that an application image in the plurality of grid regions have changed, offsetting positions of the grid regions, so that the changed portions of the application image are in fewer grid regions using a computer system. The method also can include transmitting image data in the offset grid regions
(Continued)

involving the changed portions of the application image and identifications and offset data of the offset grid regions to an application sharing client.

6 Claims, 3 Drawing Sheets

Related U.S. Application Data continuation of application No. 13/239,446, filed on Sep. 22, 2011, now Pat. No. 9,769,515.

(56) References Cited

U.S. PATENT DOCUMENTS

| | | | |
|---|---|---|---|
| 7,203,359 B1* | 4/2007 | Padlia | G06F 3/1462 |
| | | | 382/173 |
| 8,255,461 B1 | 8/2012 | Liu et al. | |
| 9,769,505 B2 | 9/2017 | Chen et al. | |
| 9,769,516 B2 | 9/2017 | Chen et al. | |
| 2005/0069189 A1 | 3/2005 | Bartell | |
| 2005/0091571 A1 | 4/2005 | Leichtling | |
| 2005/0128511 A1 | 6/2005 | Hornback, Jr. et al. | |
| 2005/0132045 A1 | 6/2005 | Hornback, Jr. et al. | |
| 2006/0012612 A1 | 1/2006 | Johnston et al. | |
| 2006/0210196 A1 | 9/2006 | Wensley et al. | |
| 2007/0110303 A1 | 5/2007 | Bhattacharjya et al. | |
| 2008/0212883 A1 | 9/2008 | Park | |
| 2009/0119365 A1 | 5/2009 | Tomic | |
| 2009/0125838 A1 | 5/2009 | Bhogal et al. | |
| 2009/0183085 A1 | 7/2009 | Pasetto et al. | |
| 2009/0210817 A1 | 8/2009 | Schmieder et al. | |
| 2009/0285496 A1 | 11/2009 | Collins | |
| 2009/0307428 A1 | 12/2009 | Schmieder et al. | |
| 2011/0141133 A1 | 6/2011 | Sankuratri et al. | |
| 2012/0075333 A1 | 3/2012 | Chen et al. | |
| 2012/0281023 A1 | 11/2012 | Chen et al. | |

FOREIGN PATENT DOCUMENTS

| | | |
|---|---|---|
| CN | 101052986 A | 10/2007 |
| CN | 101420610 A | 4/2009 |
| CN | 101789870 A | 7/2010 |
| CN | 102437999 A | 5/2012 |
| GB | 2318956 A | 5/1998 |

OTHER PUBLICATIONS

U.S. Appl. No. 13/239,446, Non-final Office Action, dated Jun. 6, 2013, 24 pg.
U.S. Appl. No. 13/239,446, Final Office Action, dated Sep. 7, 2013, 26 pg.
U.S. Appl. No. 13/239,446, Examiner's Answer, dated Mar. 21, 2014, 12 pg.
U.S. Appl. No. 13/239,446, Decision on Appeal, May 3, 2016, 12 pg.
U.S. Appl. No. 13/239,446, Non-Final Office Action, dated Sep. 6, 2016, 13 pg.
U.S. Appl. No. 13/239,446, Final Office Action, dated Feb. 3, 2017, 15 pg.
U.S. Appl. No. 13/239,446, Notice of Allowance, dated May 18, 2017, 5 pg.
U.S. Appl. No. 13/554,081, Non-Final Office Action, dated Dec. 7, 2012, 18 pg.
U.S. Appl. No. 13/554,081, Non-final Office Action, dated Jun. 13, 2013, 23 pg.
U.S. Appl. No. 13/554,081, Final Office Action, dated Sep. 17, 2013, 27 pg.
U.S. Appl. No. 13/554,081, Examiner's Answer, dated Mar. 21, 2014, 13 pg.
U.S. Appl. No. 13/554,081, Decision on Appeal, May 17, 2016, 12 pg.
U.S. Appl. No. 13/554,081, Non-final Office Action, dated Sep. 6, 2016, 12 pg.
U.S. Appl. No. 13/554,081, Final Office Action, dated Feb. 3, 2017, 14 pg.
U.S. Appl. No. 13/554,081, Notice of Allowance, dated May 18, 2017, 5 pg.
Boyaci, O., et al., "BASS Application Sharing System," 10th IEEE Int'l. Sym. on Multimedia, 2008, pp. 432-439 [retrieved Jul. 20, 2011] retrieved from the Internet: <www.cs.columbia.edu/~hgs/papers/demo_paper.pdf>.
Hasan, S. M., et al., "Multicast Application Sharing Tool for the Access Grid Toolkit," Proc. of the UK e-Science All Hands Meeting 2005, © EPSRC Sep. 2005, pp. 433-440.

* cited by examiner

METHOD AND SYSTEM FOR IMPROVING APPLICATION SHARING BY DYNAMIC PARTITIONING

CROSS-REFERENCE TO RELATED APPLICATIONS

This application claims the benefit of Chinese Application Number 201010506211.4 filed on Sep. 29, 2010, which is incorporated herein by reference in its entirety.

TECHNICAL FIELD

The present invention relates to the field of information technology, particularly, to application sharing, and more particularly, to a method and system for improving application sharing by dynamic partitioning.

BACKGROUND

Application sharing technology allows capturing a series of images representing the screen display of an application running on a computing apparatus (which can be referred to as the host or server of the application sharing) or event on the screen display of the operating system desktop of the computing apparatus, and transmitting the series of images to at least one of other computing apparatus (which can be referred to as clients of the application sharing) via a computer communication network for them to be displayed on the other computing apparatus, so as to provide a screen display which is consistent with the screen display of the application or the operating system in the host environment to the users of other computer apparatus. The application sharing technology has become an important tool in our daily work, especially for a virtual team of which the team members are in different locations.

If in an application sharing session, the images on the application sharing server are updated, it is necessary to update the images on the application sharing clients correspondingly. In the current application sharing technology, in order to improve the image updating efficiency in the application sharing, the screen display of the application is partitioned into grid regions. Each region can be individually captured, scanned to detect changes, compressed and transmitted to the application sharing clients. By partitioning the screen display of the application into smaller and manageable grid regions, processor-intensive operations can be performed on smaller data blocks, thus improving the responsiveness of the application on the host. In addition, it is only necessary to transmit the regions in which the application screen image has changed (as well as the numbers or identifications of the regions) to the application sharing client, and unnecessary to transmit the regions in which the application screen image has not changed, thus the network data transmission load is reduced, and the update speed of the application screen display of the application sharing client is improved.

The U.S. Pat. No. 7,171,444, "Remote Desktop Protocol Compression System", describes a remote desktop communication protocol. Its embodiments partition the screen into grid regions with the same size, and the size of a region is arbitrary; however, it is usually 64×64 pixels in a remote desktop protocol environment. If the remote desktop server detects changes in the image output, and the changes are contained in one or more specific regions, then only the image data of the regions that have changed and the numbers or identifications of the regions need to be transmitted to the client. In the cache of the client, the previous image data of the regions of the whole screen are cached. Therefore, the client only needs to determine which regions are changed and which regions are not changed according to the received numbers of the regions that have changed, and combine the cached image data of the regions that have not changed and the received image data of the regions that have changed, to re-create and display the whole screen image. Detecting the changes in the image output can be simply realized by, e.g., bit-wise XOR the pixels with the same position in the two captured screen bitmaps.

In the current application sharing technology, the size and positions of the grid regions are fixed, which can not be optimized for network transmission. This is because the shapes and sizes of the portions that have changed in the screen display of the application differ in numerous ways, and they are usually not aligned with the edges of the grid regions. Therefore, some grid regions may only contain a small amount of pixels that have changed (there may be only one or two changed pixels in extreme situations), while the current technology will still transmit the data of the whole regions to the client, thus resulting in the low efficiency of data transmission and waste of network bandwidth.

BRIEF SUMMARY

The embodiments disclosed within this specification relate to information technology and, more particularly, to improving application sharing by dynamic partitioning.

One embodiment can include a method for improving application sharing by dynamic partitioning. The method can include partitioning a screen display of an application into grid regions and, in response to detecting that an application image in the plurality of grid regions have changed, offsetting positions of the grid regions, so that the changed portions of the application image are in fewer grid regions using a computer system. The method also can include transmitting image data in the offset grid regions involving the changed portions of the application image and identifications and offset data of the offset grid regions to an application sharing client.

Another embodiment can include a system. The system can include a computer readable storage medium having computer readable program code embodied therewith and a processor coupled to the computer readable storage medium. Responsive to executing the computer readable program code, the processor can be configured to perform the various functions and/or operations described within this specification.

Another embodiment can include a computer program product. The computer program product can include a computer readable storage medium having computer readable program code embodied therewith. The computer readable program code can include computer readable program code configured for implementing the various functions and/or operations described within this specification.

The present invention can reduce the number of regions that need network transmission when the screen is updated in application sharing, save network bandwidth, and improve the responsiveness of the application sharing client.

BRIEF DESCRIPTION OF THE SEVERAL VIEWS OF THE DRAWINGS

The appended claims set forth the inventive features which are considered characteristic of the present invention. However, the invention itself and its preferred embodiments, additional objects, features and advantages will be better understood by referring to the detailed description of the exemplary embodiments when read in conjunction with the attached drawings, in which:

DETAILED DESCRIPTION

The technical solution of the present invention can dynamically partition the screen display of an application according to the shape and position of the changed portions of the application image in application sharing, that is, offsetting the positions of initially partitioned grid regions to reduce the number of the grid regions that include the changed portions of the application image, so as to reduce the image data in the grid regions that need to be transmitted to the application sharing client via network, save network bandwidth and improve the responsiveness of the sharing application client.

Embodiments of the present invention will now be described with reference to the accompanying drawings. In the following description, numerous details are described for a more comprehensive understanding of the present invention. However, it is obvious to those skilled in the art that implementation of the present invention can exclude some of these details. In addition, it should be appreciated that the present invention is not limited to the described specific embodiments. On the contrary, it is contemplated to implement the present invention by using any combination of the following features and elements, no matter whether they involve different embodiments or not. Therefore, the following aspects, features, embodiments and advantages are only illustrative, rather than elements or limitations of the appended claims, unless explicitly stated otherwise in the claims.

Figure 1B:
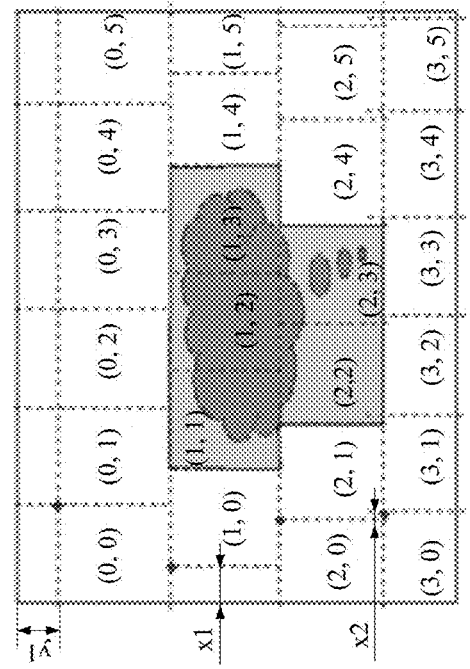
FIG. 1B illustrates a dynamic grid partitioning scheme for application sharing according to an embodiment of the present invention.
Figure 1A:
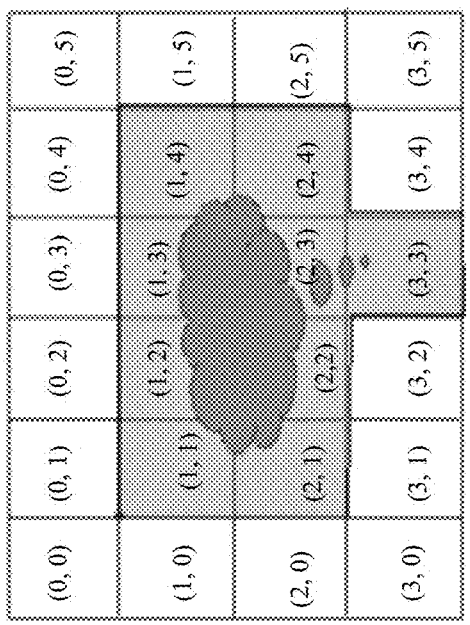
FIG. 1A illustrates a traditional static grid partitioning scheme for application sharing.

FIG. 1A illustrates a traditional static grid partitioning scheme for application sharing; FIG. 1B illustrates a dynamic grid partitioning scheme for application sharing according to an embodiment of the present invention. As shown in FIG. 1A, in the traditional static grid partitioning scheme for application sharing, the screen display of the application is partitioned into totally 24 grid regions of 4 rows×6 columns. The identifications or numbers of the grid regions are (0,0), (0,1), (0,2), (0,3), (0,4), (0,5), (1,0), (1,1), (1,2), (1.3), (1,4), (1,5), (2,0), (2,1), (2,2), (2,3), (2,4), (2,5), (3,0), (3,1), (3,2), (3,3), (3,4), (3,5), wherein the changed portions of the application image are included in 9 gird regions (1,1), (1,2), (1,3), (1,4), (2,1), (2,2), (2,3), (2,4), (3,3), and therefore the application sharing server needs to transmit the image data in these 9 grid regions to the application sharing client. As shown in FIG. 1B, according to an embodiment of the present embodiment, since the grid regions are offset, including a longitudinal offset with an offset amount of y1 to all the grids as a whole and a latitudinal offset with an offset amount of x1 to the second row and a latitudinal offset with an offset amount of x2 to the third row, the changed portions of the application image are only included in 5 grid regions (1,1), (1,2), (1,3), (2,1) and (2,3), and the application sharing server only needs to send the image data in the 5 grid regions (as well as the numbers or identifications of the grid regions and related offset data) to the application sharing client.

Figure 2:
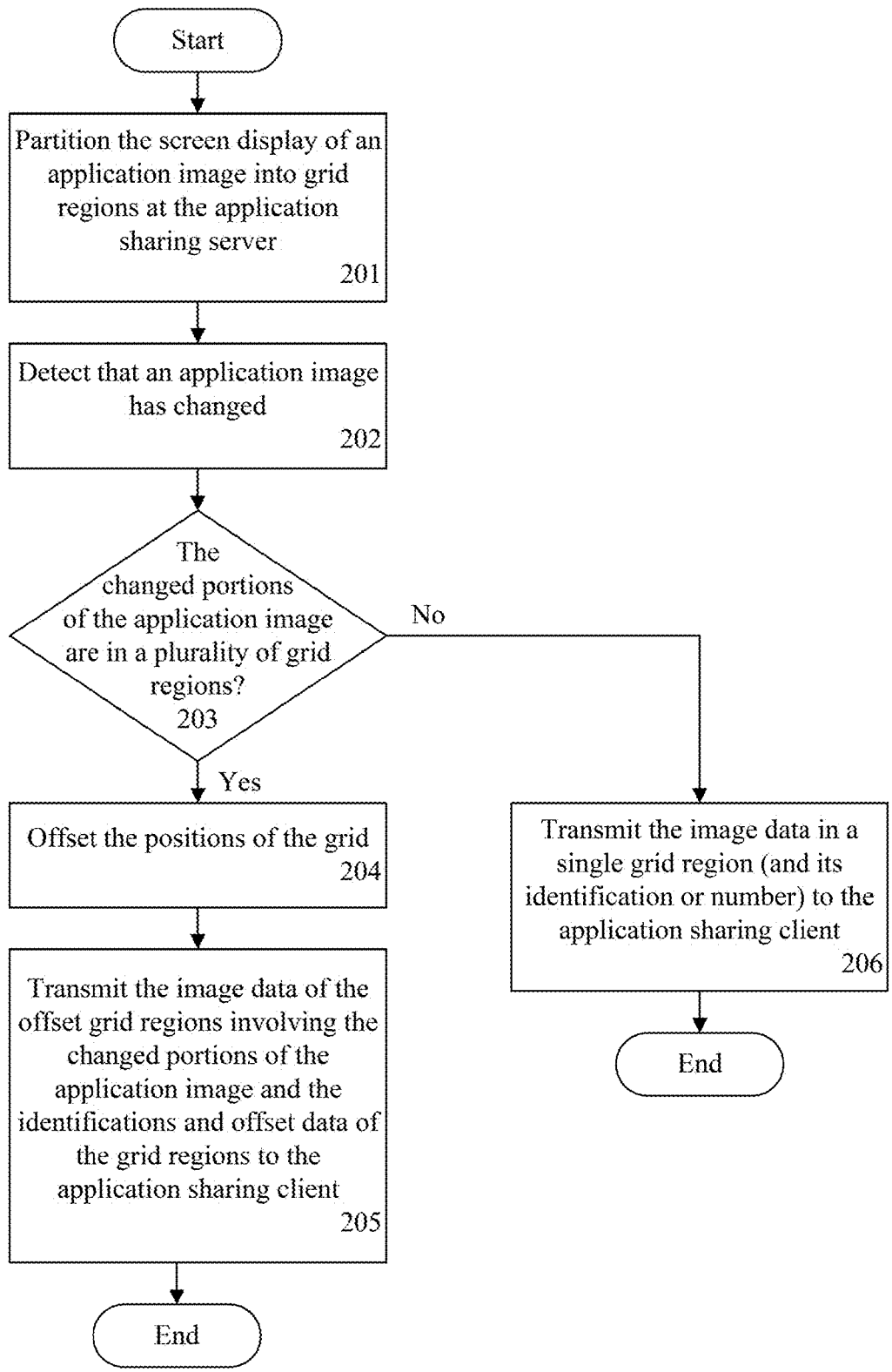
FIG. 2 illustrates a method for improving application sharing by dynamic partitioning according to an embodiment of the present invention.

Now referring to FIG. 2, it illustrates a method for improving application sharing by dynamic partitioning according to an embodiment of the present invention. As shown, the method includes the following steps.

At step 201, the screen display of the application is partitioned into grid regions at the application sharing server. This step may be the same as the method for partitioning the screen display of the application into grid regions in the prior art. For example, the screen display of the application may be partitioned into grid regions of 64×64 pixels, and each grid region is allocated with a unique number or identification. Thus, after the application is started, the initial image of the application may be transmitted to the application sharing client in the form of grid regions, i.e., the image data in the grid regions and the numbers or identifications of the grid regions may be transmitted to the application sharing client, so as to be displayed at the application sharing client and cached.

At step 202, changes of the application image are detected. A current technique may be used to detect changes of the application image and determine the changed portions of the application image, e.g., by simply bit-wise XOR the pixels in the same positions of a former and latter application images.

At step 203, it is determined whether the changed portions of the application image are in a plurality of grid regions. As those skilled in the art know, the position coordinates of the pixels in the changed portions of the application image and the position coordinates of the grid regions can be compared to determine in which grid regions the pixels in the changed portions of the application image are, and further to determine whether the changes portions of the application image are in a plurality of grid regions.

At step 204, in response to determining that the changed portions of the application image are in a plurality of grid regions, the positions of the grid regions are offset, so as to make the changed portions of the application image in fewer grid regions. That is to say, by offsetting the positions of the grid regions, the changed portions of the application image will involve fewer grid regions as compared with before the offsetting. In this way, image data in fewer grid regions can be transmitted to the application sharing client, thus saving network bandwidth. Preferably, the offsetting should make the changed portions of the application image involve as few grid regions as possible, that is, among all the possible offsetting schemes, selecting the offsetting scheme that makes the changed portions of the application image involve the fewest grid regions. However, this is not necessary for the present invention. In many cases, it is only needed to select an offsetting scheme that makes the changed portions of the application data involve close to the fewest grid regions, so as to save the calculation amount required for selecting an offsetting scheme. Actually, as long as the grid regions which the changed portions of the application image involve after the offsetting are fewer than the grid regions which the changed portions of the application image involve before the offsetting, the technical effect of saving network resources may be produced.

According to an embodiment of the present invention, offsetting the positions of the grid regions comprises: within the range of the height of a grid region in the longitudinal direction and the width of a grid region in the latitudinal direction, offsetting the positions of the grid regions by pixels, so as to make the changed portions of the grid regions are in fewer grid regions. That is to say, when offsetting the grid regions, it is only needed to offset within the range of the height of a grid region in the longitudinal direction and the width of a grid region in the latitudinal direction to traverse all the effective offsetting schemes. This is because, after the longitudinal offsetting exceeds the height of a grid region or the latitudinal offsetting exceeds the width of a grid region, the situation of the changed portions of the application image occupying the grid regions will repeat the previous. Further, the positions of the grid regions are offset by pixels, that is, offsetting by a fixed number of pixels, e.g., offsetting pixel by pixel, or offsetting by each 2 pixels, or offsetting by each 3 pixels, and so on.

According to an embodiment of the present invention, step 204 includes the following sub-steps:

At sub-step a, within the range of the height of a grid region in the longitudinal direction and the width of a grid region in the latitudinal direction, offsetting all the grid regions as a whole by pixels, and traversing the offsetting schemes formed in the offsetting process. Only for example, the traversing the offsetting schemes formed in the offsetting process may be traversing all the offsetting schemes formed in the offsetting process. For example, in the case of a grid size of 64×64, this sub-step will obtain 64×64 offsetting schemes. This sub-step may be implemented in multiple ways. All the grid regions as a whole may be moved downward or upward by pixels until they are moved by the height of a grid region to form a series of longitudinal positions, and for each longitudinal position, all the grid regions as a whole may be moved rightward or leftward by pixels they are moved by the width of a grid region. Of course, all the grid regions as a whole may be also first moved rightward or leftward by pixels, and then for each latitudinal position, all the grid regions as a whole may be moved downward or upward by pixels.

At sub-step b, calculating the number of grid regions that include the changed portions of the application image in the offsetting schemes that have been traversed. For each offsetting scheme, the position coordinates of the pixels in the changed portions of the application image and the position coordinates of the grid regions under the offsetting scheme can be compared to determine in which grid regions the changed portions of the application image are, thereby calculating the number of grid regions involving the changed portions of the application image.

At sub-step c, determining the offsetting scheme in the offsetting schemes that have been traversed, having the least number of grid regions involving the changed portions of the application image as the final offsetting scheme. This offsetting scheme may be denoted by a latitudinal axis offset and a longitudinal axis offset. Thus, in the following steps, the image data in the grid regions involving the changed portions of the application image under the offsetting scheme (and the numbers of the grid regions, and the latitudinal axis offset and longitudinal axis offset of the offsetting scheme) may be transmitted to the application sharing client.

The above embodiment usually can achieve the technical effect of reducing the number of grid regions involving the changed portions of the application image; however, since the embodiment performs offsetting for all the grid regions as a whole in both the longitudinal direction and the latitudinal direction, in the case that the shape of the changed portions of the application image is complex (as those shown in FIGS. 1A and 1B), the effect of reducing the number of grid regions involving the changed portions of the application image may not be very significant.

According to another embodiment of the present invention, step 204 includes the following sub-steps:

At sub-step a, within the range of the height of a grid region in the longitudinal direction and the width of a grid region in the latitudinal direction, offsetting all the grid regions as a whole by pixels in one direction of the longitudinal direction and the latitudinal direction, while in the other direction of the longitudinal and the latitudinal directions, offsetting each row along the direction of grid regions involving the changed portions of the application image as a whole by pixels, and traversing the offsetting schemes formed in the offsetting process. For example, it can be done to offset all the grid regions upward or downward as a whole pixel by pixel within the range of the height of a grid region in the longitudinal direction, and at each position in the longitudinal direction, for the several rows of grid regions involving the changed portions of the application image, offset each of the rows of grid regions rightward or leftward as a whole pixel by pixel within the range of the width of a grid region respectively, so as to traverse all the offsetting schemes. Each offsetting scheme formed in this way may be denoted by a longitudinal axis offset and the latitudinal axis offsets of several rows of grid regions. For example, in the case that the grid size is 64×64 and the changed portions of the application image involve 3 rows of grid regions in each offset position in the process of longitudinal offsetting pixel by pixel, this sub-step may obtain $64^4$ offsetting schemes. Of course, it also can be done to offset all the grid regions as a whole rightward or leftward pixel by pixel within the range of the width of a grid region in the latitudinal direction, and at each position in the latitudinal direction, for the several columns of grid regions that involve the changed portions of the application image, offset each of the columns of grid regions as a whole downward or upward pixel by pixel within the range of the height of a grid region respectively, so as to traverse all the effective offsetting schemes. Each offsetting scheme formed in this way may be denoted by a latitudinal axis offset and the longitudinal axis offset of several columns of grid regions.

At sub-step b, calculate the numbers of grid regions involving the changed portions of the application image for the offsetting schemes that have been traversed. For each offsetting scheme, the position coordinates of the respective pixels in the changed portions of the application image and the position coordinates of the respective grid regions under the offsetting scheme can be compared to determine in which grid regions the changed portions of the application image are, thus to calculate the number of grid regions involving the changed portions of the application image.

At sub-step c, determining, among the offsetting schemes that have been traversed, the offsetting scheme that has the least number of grid regions involving the changed portions of the image as the final offsetting scheme, which may be denoted by a longitudinal axis offset and the latitudinal axis offsets of several columns of grid regions, or by a latitudinal axis offset and the longitudinal axis offsets of several columns of grid regions. Thus, in the following step, the image data in the grid regions involving the changed portions of the application image under the offsetting scheme (and the numbers of the grid regions, and the relevant latitudinal axis offsets and longitudinal axis offsets of the offsetting scheme) are transmitted to the application sharing client.

This embodiment can usually find an optimal or close to optimal offsetting scheme, under which the number of grid regions involving the changed portions of the application data is the least or close to the least, thereby achieving the technical effect of significantly reducing the number of grid regions involving the changed portions of the application image; however, the calculation amount of this embodiment is large.

According to another embodiment of the present invention, step 204 includes the following sub-steps:

At sub-step a, within the range of the height of a grid region in the longitudinal direction and the width of a grid region in the latitudinal direction, offsetting all the grid regions as a whole by pixels in one of the longitudinal direction and latitudinal direction, until during the offsetting of all the grid regions as a whole by pixels in this direction, the changed portions of the application image are included in the least number of grid regions.

At sub-step b, along the other direction of the longitudinal direction and latitudinal direction, offsetting each row of grid regions along the other direction involving the changed portions of the application image as a whole by pixels, until for each row of grid regions, the changed portions of the application image are included in the least number of grid regions.

That is to say, first within the range of a grid region in the longitudinal direction, offsetting all the grid regions as a whole downward or upward by pixels, calculating the number of grid regions involving the changed portions of the application image in each longitudinal offset position, and select the longitudinal offset position with the least number of grid regions involving the changed portions of the application image; then, within the range of the width of a grid region in the latitudinal direction, offsetting each row of grid regions in the several rows of grid regions involving the changed portions of the application image as a whole rightward or downward by pixels, and for each row of grid regions, calculating the number of grid regions involving the changed portions of the application image at each latitudinal offset position, and selecting the latitudinal offset position with the least number of grid regions involving the changed portions of the application image. The offset formed in this way may be denoted by a longitudinal offset and the latitudinal offsets of several rows of grid regions.

Alternatively, first within the range of a grid region in the latitudinal direction, offsetting all the grid regions as a whole rightward or downward by pixels, calculating the number of grid regions involving the changed portions of the application image in each latitudinal offset position, and select the latitudinal offset position with the least number of grid regions involving the changed portions of the application image; then, within the range of the height of a grid region in the longitudinal direction, offsetting each column of grid regions in several columns of grid regions involving the changed portions of the application image as a whole downward or upward by pixels, and for each column of grid regions, calculating the number of grid regions involving the changed portions of the application image at each longitudinal offset position, and select the longitudinal offset position with the least number of grid regions involving the changed portions of the application image. The offset scheme formed in this way may be denoted by a latitudinal offset and the longitudinal offsets of several columns of grid regions.

This embodiment can usually find an offsetting scheme with relatively small number of grid regions involving the changed portions of the application image, and the calculation amount is not so large. For example, in the case that a grid region size is 64×64 and the changed portions of the application image involve 3 rows of grid regions at the final longitudinal offset positions, the calculation amount of this embodiment is: 64 longitudinal offset positions+3×64 latitudinal offset positions.

According to another embodiment of the present invention, step 204 includes the following sub-steps:

At sub-step a, offsetting all the grid regions as a whole in eight directions of up, down, left, right, up-left, down-left, up-right and down-right by respective ½ grid region height or ½ grid region width respectively (i.e., offsetting by ½ grid region height in the up and down directions, offsetting by ½ grid region width in the left and right directions, and the offsetting in the up-left, down-left, up-right and down-right directions has a latitudinal component of ½ grid region width and a longitudinal component of ½ grid region height), and selecting the offset position or the initial position of the grid regions with the changed portions of the application image included in the least number of grid regions from the above eight offset positions and the initial position of the grid regions.

At sub-step b, perform the previous step recursively with half of the offset used in the previous step, until the changed portions of the application image are included in the least number of grid regions. That is to say, starting from the offset position or the initial position selected at sub-step a, offsetting the grid regions as a whole in eight directions of up, down, left, right, up-left, down-left, up-right and down-right by respective ¼ grid region height or ¼ grid region width respectively (i.e., offsetting by ¼ grid region height in the up and down directions, offsetting by ¼ grid region width in the left and right directions, and the offsetting in the up-left, down-left, up-right and down-right directions has a latitudinal component of ¼ grid region width and a longitudinal component of ¼ grid region height), and selecting the offset position or the previous position with the changed portions of the application image included in the least number of grid regions from the eight offset positions formed in sub-step b and the previous position formed in sub-step a (i.e., the offset position or the initial position selected in sub-step a). The above step is repeated until the number of grid regions involving the changed portions of the application image cannot become smaller; at this time, it may be determined that the changed portions of the application image is included in the least number of grid regions. The offsetting scheme formed in this way may be denoted by a longitudinal axis offset, or a latitudinal axis offset, or both the longitudinal axis offset and latitudinal axis offset.

At sub-step c, along the longitudinal direction or latitudinal direction, offsetting each row of grid regions along this direction that involve the changed portions of the application image as a whole by pixels respectively until the changed portions of the application image are included in the least number of grid regions for each row of grid regions. The offsetting scheme formed in the step may be denoted by a longitudinal axis offset and the latitudinal axis offsets of several rows of grid regions, or by a latitudinal axis offset and the longitudinal axis offsets of several columns of grid regions.

While specific methods for offsetting the positions of grid regions so that the changed portions of the application image are in fewer grid regions according to some embodiments of the present invention are described above, it should be pointed out that, the above embodiments are only exemplary, and not intended as limitations to the present invention. As known by those skilled in the art, there may be many other specific methods for offsetting the positions of the grid regions so as to make the changed portions of the application image be in fewer grid regions. For example, as known by those skilled in the art, all the possible offsetting schemes may be considered as a state space, and an optimal or feasible offsetting scheme may be searched out from the state space by using a variety of heuristic searching algorithms with a low algorithm complexity.

At step 205, the image data in the offset grid regions including the changed portions of the application image and the identifications and offset data of the grid regions can be transmitted to the application sharing client, so that the application sharing client may generate and display the changed application images according to the image data in the offset grid regions involving the changed portions of the application image and the offsets of the grid regions, as well as the image data of the previous application image in the respective grid regions cached at the application sharing client. Since the number of grid regions including the changed portions of the application image is fewer after the offsetting, grid transmission bandwidth is saved.

For example, for the embodiment that offsets all the grid regions as a whole in the longitudinal direction and latitudinal direction, it is needed to transmit the image data in each offset grid region involving the changed portions of the application image and the identification or number of each grid region to the application sharing client, and a longitudinal axis offset and a latitudinal axis offset. For the embodiment that offsets all the grid regions as a whole in the longitudinal direction and offsets each row in the several rows of grid regions involving the changed portions of application image as a whole in the latitudinal direction respectively, it is needed to transmit the image data in each offset grid region involving the changed portions of the application image and the identification or number of each grid region, and a longitudinal axis offset and the latitudinal axis offset of each row of grid regions involving the changed portions of the application image to the application sharing client. For the embodiment that offsets all the grid regions as a whole in the latitudinal direction and offsets the each column in the several columns of grid regions involving the changed portions of the application image as a whole in the longitudinal direction respectively, it is needed to transmit the image data in each offset grid region involving the changed portions of the application image and the identification or number of the each grid region, and a latitudinal axis offset and the longitudinal axis offset of each column of grid regions involving the changed portions of the application image to the application sharing client.

After the application sharing client receives the image data in the offset grid regions involving the changed portions of the application image and the identifications and offset data of the grid regions from the application sharing server, the application sharing client may first obtain the previously cached entire application image, i.e. the previously cached image data in all the grid regions that include the screen display of the application, from its cache, and then calculate the positions of the offset grid regions involving the changed portions of the application image corresponding to the image data in all the grid regions that include the screen display of the application according to the received identifications and associated offset data of the offset grid regions involving the changed portions of the application image, and use the image data in the offset grid regions involving the changed portions of the application image to replace the image data in the corresponding positions of all the grid regions that include the screen display of the application, so as to generate an entire application image including the changed portions and display it.

For example, with respect to the example shown in FIGS. 1A and 1B, the image data in the entire grid regions that include the screen display of the application previously received from the application sharing server have been cached at the application sharing client. After receiving the image data in the offset grid regions (1,1), (1,2), (1,3), (2,2), (2,3) that include the changed portions of the application image, their identifications or numbers (1,1), (1,2), (1,3), (2,2), (2,3) and the associated offset data (x1, x2, y1) from the application sharing server, the application sharing client may first obtain the cached image data in all the grid regions that include the previous screen display of the application, and then according to the received numbers (1,1), (1,2), (1,3), (2,2), (2,3) of the grid regions that include the changed portions of the application image and the offset data (x1, x2, y1), determine that the offset of the grid regions (1,1), (1,2), (1,3) is (x1, y1) and the offset of the grid regions (2,2), (2,3) is (x2, y1), so as to obtain the position of each offset grid region (and each pixel therein) including the changed portions of the application image corresponding to the image data in all the grid regions of the previous screen display of the application, and use the image data in each offset grid region that includes the changed portions of the application image to replace the image data in the corresponding position of all the grid regions of the previous screen display of the application, so as to obtain all the image data of the application including the changed portions and display them.

According to an embodiment of the present invention, the method further comprises an optional step 206, wherein, in response to detecting that the changed portions of the application image are in a single grid region, the image data in the single grid region (and its identification or number) are transmitted to the application sharing client, so that the application sharing client can generate and display the changed application image according to the image data in the received grid region and the image data in the grid regions of previous image data cached at the application sharing client. That is to say, upon detecting that the changed portions of the application image only involve a single grid region, there is no need to offset the grid regions, and the grid region that includes the changed portions of the application image is directly transmitted to the application sharing client.

Within this specification is described a method for improving application sharing by dynamic partitioning according to embodiments of the present invention by referring the accompanying drawings. It should be pointed out that the above description is only an exemplary illustration, and not intended as a limitation to the present invention. In other embodiments of the present invention, the method may have more, less or different steps, and the relationships, such as order and inclusion relationship etc., among these steps, may be different from that which is described and illustrated. For example, in some embodiments of the present invention, steps 202, 203, 204 may be combined into one step, in which, in response to detecting that the application images in a plurality of grid regions have changed, offset the positions of the grid regions, so that the changed portions of the application image are in fewer grid regions. For further example, in some embodiments of the present invention, the method may exclude steps 203, 206. In a further example, in some other embodiments of the present invention, the method may further comprise a step of generating and displaying the application image data at the application sharing client according to the received image data in the offset grid regions involving the changed portions of the application image and the offsets of the grid regions, and the image data in the grid regions of the previous application image cached at the application sharing client.

An apparatus for improving application sharing by dynamic partitioning according to an embodiment of the present invention will now be described by referring to the accompanying drawings. The apparatus may execute the method for improving application sharing by dynamic partitioning according to an embodiment of the present invention described above. For simplicity, some details repetitive with the above description will be omitted in the following description, so a more detailed understanding of the apparatus for improving application sharing by dynamic partitioning according to an embodiment of the present invention may be obtained by referring to the above description.

Figure 3:
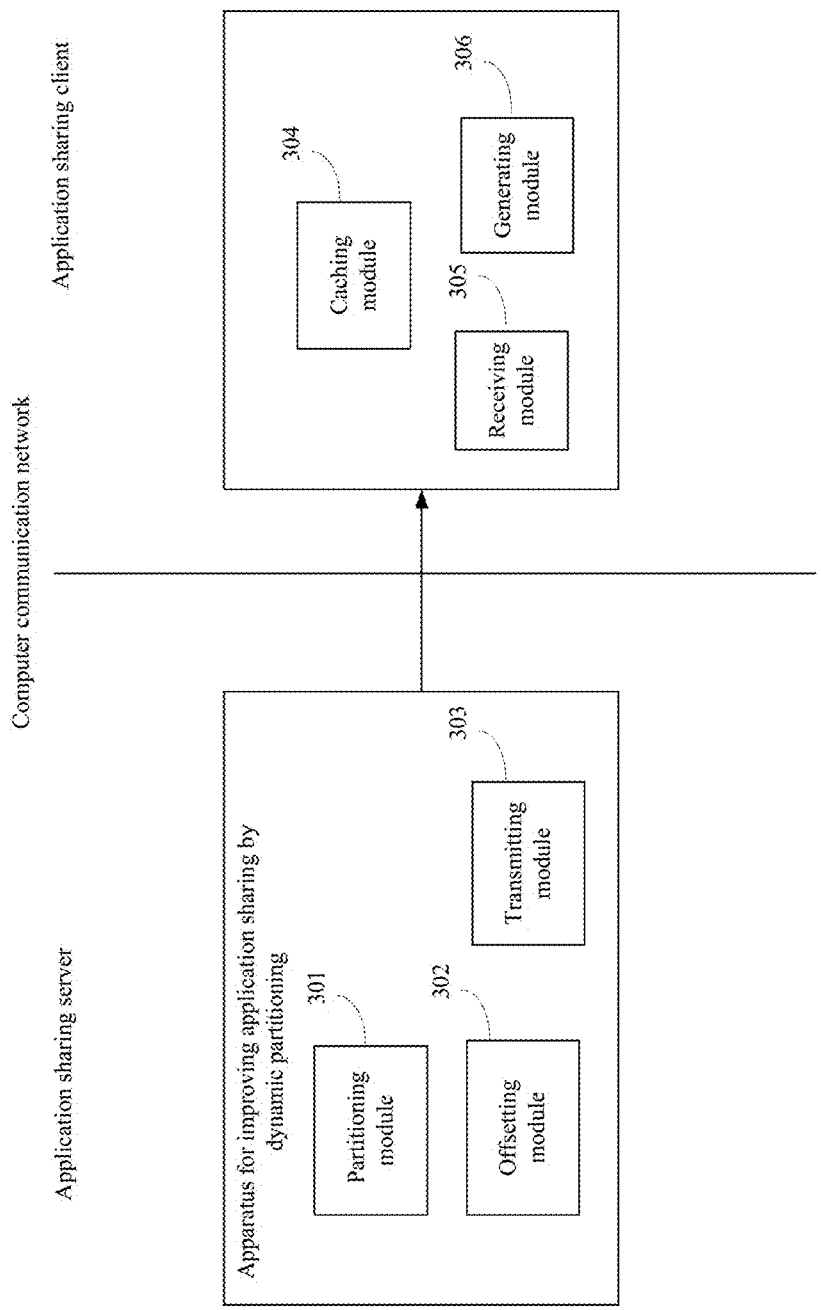
FIG. 3 illustrates an apparatus for improving application sharing by dynamic partitioning according to an embodiment of the present invention.

FIG. 3 illustrates the apparatus for improving application sharing by dynamic partitioning according to an embodiment of the present invention. As shown, the apparatus comprises: a partitioning module 301 for partitioning the screen display of an application into grid regions at the application sharing server; an offsetting module 302 for, in response to detecting that the application image in a plurality of grid regions have changed, offsetting the positions of the grid regions, so that the changed portions of the application image are in fewer grid regions; and a transmitting module 303 for transmitting the image data in the offset grid regions involving the changed portions of the application image and the identifications and offset data of the offset grid regions to the application sharing client, so that the application sharing client can generate and display the changed application image according to the received image data in the offset grid regions involving the changed portions of the application image and the offsets and identifications of the offset grid regions, and the image data of a previous application image in the grid regions cached at the application sharing client.

The apparatus is preferably implemented at the application sharing server. There may be one or more application sharing clients. At the application sharing client, there is a caching module 304 for caching the previous application image from the application sharing server, and a generating module 305 for generating the changed application image for display according to the image data in the offset grid regions involving the changed portions of the application image and the offsets and identifications of the offset grid regions received from the application sharing server, and the image data of the previous application image in the grid regions cached at the application sharing client.

The partitioning module 301 may be a module for partitioning the screen display into grid regions at the application sharing server in the current application sharing technology.

According to an embodiment of the present invention, the offsetting module 302 is further for: offsetting the positions of the grid regions within the range of the height of a grid region in the longitudinal direction and the width of a grid region in the latitudinal direction.

According to an embodiment of the present invention, the offsetting module 302 comprises: a sub-module for offsetting all the grid regions as a whole by pixels within the range of the height of a grid region in the longitudinal direction and the width of a grid region in the latitudinal direction, and traversing the offsetting schemes formed in the offsetting process; a sub-module for calculating the number of grid regions involving the changed portions of the application image in the offsetting schemes that have been traversed; and a sub-module for determining the offsetting scheme having a least number of grid regions involving the changed portions of the application image in the offsetting schemes that have been traversed as a final offsetting scheme.

According to another embodiment of the present invention, the offsetting module 302 comprises: a sub-module for offsetting all the grid regions as a whole by pixels in one direction of the longitudinal direction and latitudinal direction within the range of the height of a grid region in the longitudinal direction and the width of a grid region in the latitudinal direction, and in the other direction in the longitudinal direction and latitudinal direction, offsetting each row of grid regions along the other direction involving the changed portions of the application image as a whole by pixels, and traversing the offsetting schemes formed in the offsetting process; a sub-module for calculating the number of grid regions involving the changed portions of the application image in the offsetting schemes that have been traversed; and a sub-module for determining the offsetting scheme having a least number of grid regions involving the changed portions of the application image in the offsetting schemes that have been traversed as a final offsetting scheme.

According to another embodiment of the present invention, the offsetting module 302 comprises: a sub-module for offsetting all the grid regions as a whole by pixels along one of the longitudinal direction and latitudinal direction within the range of the height of a grid region in the longitudinal direction and the width of a grid region in the latitudinal direction, until in the offsetting of all the grid regions as a whole by pixels in this direction, the changed portions of the application image are included in the least number of grid regions; and a sub-module for, along the other direction in the longitudinal direction and latitudinal direction, offsetting each row of grid regions along the other direction involving the changed portions of the application image as a whole by pixels, until for each row of grid regions, the changed portions of the application image are included in the least number of grid regions.

According to another embodiment of the present invention, the offsetting module 302 comprises: a sub-module for offsetting the grid regions as a whole by respective ½ grid region height or ½ grid region width in the eight directions of up, down, left, right, up-left, down-left, up-right and down-right respectively, and selecting the offset position or the previous position of the grid regions with the changed portions of the application image included in the least number of grid regions from the above eight offset positions and the previous position of the grid regions; and a sub-module for recursively performing the previous step with a half of the offset used in the previous step, until the changed portions of the application image are included in the least number of grid regions; and a sub-module for, along the longitudinal direction or latitudinal direction, offsetting each row of grid regions along this direction that involve the changed portions of the application image as a whole by pixels respectively, until for each row of grid regions, the changed portions of the application image are included in the least number of grid regions.

According to an embodiment of the present invention, the transmitting module 303 is further for, in response to detecting that the application image in a single grid region has changed, transmitting the image data in the single grid region to the application sharing client, so that the application sharing client can generate and display the changed application image according to the received image data in the grid region and the image data of the previous application image in the grid regions cached at the application sharing client.

Above is described an apparatus for improving application sharing by dynamic partitioning according to embodiments of the present invention by referring to the accompanying drawings. It should be pointed out that the above description is only exemplary illustration, and not limitation to the present invention. In other embodiments of the present invention, the apparatus may have more, less or different modules and the relationships such as connection and inclusion relationships among the modules may be different from that is described and illustrated. For example, in some embodiments of the present invention, the apparatus may further comprise a detection module for detecting changes in the application image, and a determining module for determining whether the changed portions of the application image are in a plurality of grid regions. For further example, in some embodiments of the present invention, the apparatus may further comprise: at the application sharing client, a caching module 304 for caching the previous application image from the application sharing server, a receiving module 305 for receiving the image data in the offset grid regions involving the changed portions of the application image and the identifications and offset data of the offset grid regions from the application sharing server, and a generating module 306 for generating the changed application image for display according to the received image data in the offset grid regions involving the changed portions of the application image and the identifications and offset data of the offset grid regions, and the image data of the previous application image in the grid regions cached at the application sharing client. Alternatively, the caching module 304, the receiving module 305 and the generating module 306 at the application sharing client may also be viewed as being included in an apparatus for improving application sharing by dynamic partitioning that is implemented at the application sharing client.

The present invention may be realized by hardware, software, or a combination thereof. The present invention can be implemented in a single computer system in a centralized manner, or in a distributed manner in which different components are distributed in several inter-connected computer systems. Any computer system or other devices suitable for executing the method described herein are appropriate. A typical combination of hardware and software can be a general-purpose computer system with a computer program, which when being loaded and executed, controls the computer system to execute the method of the present invention and constitutes the apparatus of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A computer system can include at least one processor coupled to memory elements through a system bus. The computer system can store program code within the memory elements, e.g., computer readable storage medium(s) including physical computer memory such as random access memory, cache memory, a bulk storage device, or the like. The processor can execute the program code accessed from memory elements via the system bus to cause the computer system and, for example, the processor, to perform the various functions and/or operations described herein. The computer system can include a network adapter to facilitate communication with other computing systems.

The present invention may also be embodied in a computer program product, which includes all the features that enable realizing the methods described herein, and when being loaded into a computer system, can execute the method.

Although the present invention has been illustrated and described with reference to the preferred embodiments, those skilled in the art should appreciate that various changes both in form and details can be made thereto without departing from the spirit and scope of the present invention.

The invention claimed is:

1. A computer-implemented method within a computer hardware system, comprising:
   overlaying a plurality of grid regions over an application image having changed portions and unchanged portions;
   identifying, as a group, only the changed portions of the application image;
   offsetting, by an offset amount, the grid regions of the changed portions of the application image so that only the changed portions of the application image are in fewer grid regions;
   transmitting, to a client system, offset information including:
      offset data representing the offset amount,
      only an identity of one or more grid regions including the changed portions of the application image, and
      image data only for the one or more grid regions including the changed portions of the application image.

2. The method of claim 1, wherein the hardware processor is further configured to perform the following executable operations:
   generating a plurality of offset amounts, respectively, using a plurality of different offset schemes;
   selecting, as the offset amount to be transmitted to the client system, an offset amount resulting in a least number of grid regions including the changed portions of the application image.

3. The method of claim 1, wherein
the offset amount is by whole pixels within a range of a height of a grid region in a longitudinal direction and a width of a grid region in a latitudinal direction.

4. The method of claim 3, wherein
all the grid regions are offset along one direction of the longitudinal direction and latitudinal direction, until the changed portions of the application image are included in a least number of grid regions; and
in the other direction of the longitudinal direction and latitudinal direction, each row of grid regions are offset along the other direction that include the changed portions of the application image, until for each row of grid regions, the changed portions of the application image are included in the least number of grid regions.

5. The method of claim 3, wherein
the grid regions are offset by respective ½ grid region height or ½ grid region width in eight directions of up, down, left, right, up-left, down-left, up-right, down-right respectively;
the offset position or the previous position with the changed portions of the application image included in the least number of grid regions from the eight offset positions and the previous position of the grid regions is selected; and
the above offsetting is recursively performed until the changed portions of the application image are included in the least number of grid regions.

6. The method of claim 5, wherein
each row of grid regions are offset along a longitudinal direction or latitudinal direction, until for each row of grid regions, the changed portions of the application image are included in the least number of grid regions.

* * * * *